(12) United States Patent
Langenbach et al.

(10) Patent No.: US 10,505,678 B2
(45) Date of Patent: Dec. 10, 2019

(54) APPARATUS AND METHOD FOR AVOIDING DETERMINISTIC BLANKING OF SECURE TRAFFIC

(71) Applicant: Cisco Technology, Inc., San Jose, CA (US)

(72) Inventors: Stefan Langenbach, Lauf (DE); Gilberto Loprieno, Milan (IT); Alessandro Cavaciuti, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 39 days.

(21) Appl. No.: 15/924,219

(22) Filed: Mar. 18, 2018

(65) Prior Publication Data

US 2019/0288803 A1 Sep. 19, 2019

(51) Int. Cl.
*H04L 1/20* (2006.01)
*H04L 1/00* (2006.01)
*H04L 29/06* (2006.01)

(52) U.S. Cl.
CPC ............ *H04L 1/203* (2013.01); *H04L 1/0045* (2013.01); *H04L 1/0057* (2013.01); *H04L 63/08* (2013.01)

(58) Field of Classification Search
CPC ..... H04L 1/203; H04L 1/0045; H04L 1/0057; H04L 63/08
See application file for complete search history.

(56) References Cited

U.S. PATENT DOCUMENTS

| 6,928,603 | B1 * | 8/2005 | Castagna | H03M 13/35 |
| | | | | 714/786 |
| 8,228,861 | B1 * | 7/2012 | Nix | H04W 36/00 |
| | | | | 370/329 |
| 8,462,784 | B2 | 6/2013 | Loprieno et al. | |
| 8,942,379 | B2 | 1/2015 | Loprieno et al. | |

(Continued)

FOREIGN PATENT DOCUMENTS

| WO | 2009091309 A1 | 7/2009 |
| WO | 2009152100 A2 | 12/2009 |
| WO | 2015156994 | 10/2015 |

OTHER PUBLICATIONS

Loprieno, Gilberto et al., "Encryption Over ODU4"; in IP.com Prior Art Database. Jan. 30, 2012.

(Continued)

*Primary Examiner* — Kyle Vallecillo

(57) ABSTRACT

In one embodiment an apparatus, method, and system is described, the embodiment an apparatus, method including receiving a stream of data frames at an input interface, the data frames one of including security frames, or being included in security frames, wherein the security frames include payload data, performing forward error correction on the data frames a forward error correction (FEC) decoder, buffering received data frames at a buffer and blanker engine and building a complete security frame of the received data frames, determining whether or not to suppress taking a consequent action based on a frequency of authentication errors at an authentication engine, wherein the consequent action to be taken or suppressed, when taken, is taken upon payload data of one or more security frames including a data frame upon which an authentication error occurred. Related apparatus, methods and systems are also described.

20 Claims, 4 Drawing Sheets

(56) References Cited

U.S. PATENT DOCUMENTS

| | | | |
|---|---|---|---|
| 2005/0278565 A1* | 12/2005 | Frattura | G06F 21/6263 |
| | | | 714/5.1 |
| 2014/0133653 A1* | 5/2014 | Loprieno | H04L 9/3226 |
| | | | 380/256 |
| 2014/0380132 A1 | 12/2014 | Ran | |
| 2015/0089332 A1 | 3/2015 | Chambers et al. | |
| 2019/0174449 A1* | 6/2019 | Shan | H04W 60/04 |

OTHER PUBLICATIONS

Lee, Yang-Han; "Design of Optical Decoder and Optical Address Translator for High Speed Optical Switching Network"; published in Microwave and Optoelectronics Conference, 1997. Linking to the Next Century Proceedings., 1997.

International Search Report and Written Opinion in counterpart International Application No. PCT/US2019/021777, dated Jun. 6, 2019, 13 pages.

\* cited by examiner

APPARATUS AND METHOD FOR AVOIDING DETERMINISTIC BLANKING OF SECURE TRAFFIC

TECHNICAL FIELD

The present disclosure generally relates to secure payload transport on forward error correction (FEC) high speed communications links.

BACKGROUND

Optical dense wavelength division multiplexing (DWDM) networks typically use modern iteratively decoded forward error correction (FEC) codecs with hidden error floors at very low bit error rate (BER) levels. When secure transport, featuring authenticated encryption is added to such networks, there is a potential that post FEC-errors lead to erroneous authentication fail (AF) events. These erroneous AF events are a consequence of the FEC-error and not indicative of non-authentic traffic.

Such high-throughput coherent optical transmission systems employ modern FEC codecs with iterative soft decoding in order to allow operating at high levels of pre-FEC BERs. Unlike Reed-Solomon FEC codecs which have a predictable and an increasingly steeper BER "waterfall" curve, these modern codecs typically exhibit an error floor which typically sets in at a low post-FEC BER (typically below a BER of $10^{-15}$).

In iteratively decoded FEC codecs, the error floor may be caused by error patterns that 'confuse' the decoder. Such error patterns may be referred to as "trapping sets", or as "stall patterns", since the decoder appears to "stall", i.e. get locked without further reduction of bit errors over iterations.

The post-FEC BER actually required for long term error free operation is significantly below what can actually be measured and verified (e.g. below $10^{-18}$, further decreasing with increasing throughput). Therefore, because the error floor might actually begin, for example, at $10^{-16}$, it may be the case that sporadic post-FEC Errors (called Background Block Errors in older literature and standards) will occur during field operation, when classical system margin allocations are used.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment an apparatus, method, and system is described, the embodiment an apparatus, method including receiving a stream of data frames at an input interface, the data frames one of including security frames, or being included in security frames, wherein the security frames include payload data, performing forward error correction on the data frames a forward error correction (FEC) decoder, buffering received data frames at a buffer and blanker engine and building a complete security frame of the received data frames, determining whether or not to suppress taking a consequent action based on a frequency of authentication errors at an authentication engine, wherein the consequent action to be taken or suppressed, when taken, is taken upon payload data of one or more security frames including a data frame upon which an authentication error occurred. Related apparatus, methods and systems are also described.

Example Embodiment

Figure 1:
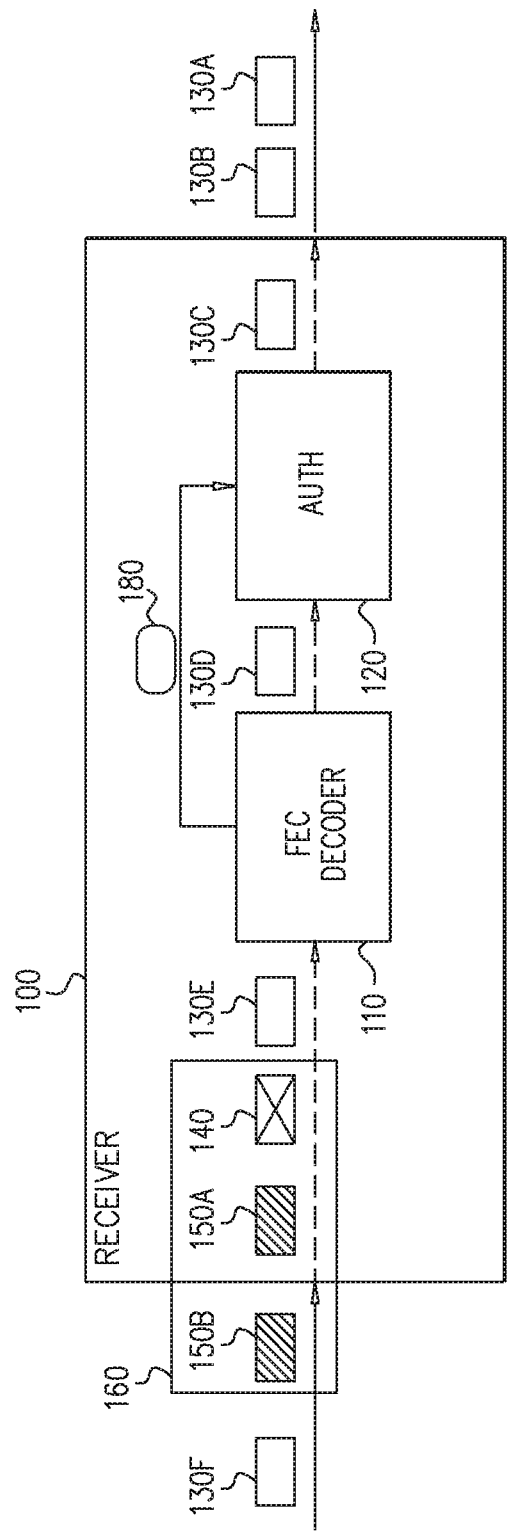
FIG. 1 is a simplified block diagram of a receiver system having a forward error correction (FEC) decoder and an authentication engine, and several data frames in a high-speed network constructed and operative in accordance with an example embodiment.

FIG. 1 is a simplified block diagram of a receiver system 100 constructed and operative in accordance with an example embodiment. The receiver system 100 comprises a forward error correction (FEC) decoder 110, an authentication engine (AUTH) 120, and a cryptographic decryptor (not depicted). The receiver system 100 is situated, by way of example, in an optical transport network (OTN). Several OTN frames, referred to hereinafter as "data frames", are depicted in FIG. 1 as blocks 130A-F, 140, and 150A-B. Said data frames 130A-F, 140, and 150A-B represent a continuous stream of data frames in various states of processing by the receiver system 100. The data frames 130A-F, 140, and 150A-B carry securely transported client data traffic (such as Ethernet packets encoded in a block stream generated by a Physical Coding Sublayer (PCS) which is mapped into the payload section of the data transport frame).

When a data transport stream is a secure transport stream with authentication, an integrity check value (ICV) field is appended to the payload of a security frame, such as security frame 160, by an upstream transmitter. As is known in the art, addition of security frames to a data transport stream typically entails a fixed "phase relation" between data frames in the data transport stream and the security frames, and an unused data frame overhead which can be used for overhead of the security frames. It is also noted that said payload may be encrypted. The security frame may itself comprise a group of data frames, as, for example, security frame 160 is depicted as comprising data frames 140, and 150A-B. Alternatively, several security frames may be packed into the payload area of a single data frame. By way of example, data frame 130D may comprise several such security frames (which are not depicted). The ICV field enables checking and validating the authenticity of the sender of the various data frames represented in FIG. 1 by blocks 130A-F, 140, 150A-B at the receiver system 100. The authentication engine 120 recomputes the ICV from the data frames and compares the recomputed ICV with the received ICV, i.e., the ICV which was computed at an upstream transmitter. When an ICV mismatch between the recomputed ICV and the received ICV is detected, the authentication engine 120 invokes an Authentication Fail (AF) event.

It is appreciated that the previous description applies to a continuous stream of data frames as noted above, as in OTN, or alternatively, by way of example, Synchronous Digital Hierarchy (SDH) or Synchronous Optical Networking (SONET). Such a continuous stream is mentioned in contrast to a discrete packet stream with gaps of varying size between packets. Such discrete packet streams typically rely on security packet protocols which apply on a per packet basis, such as the Media Access Control Security (MACsec) and Internet Protocol Security (IPsec) protols. In the MACsec and IPsec protocols, a packet which fails authenticaion may be dropped or deleted. In a continuous data stream, data frames may modified but not dropped or deleted. Embodiments which are described below for avoiding a consequent action following an AF event may also be applied in packet security protocols.

Blocks 130E, 140, 150A-B, and 130F may be referred to as "received" frames, as they are depicted either as having been or as being received by the receiver system 100, but have not yet been processed by the receiver system 100. Block 130D may be referred to as a "decoded" frame, as it has been decoded by the FEC decoder 110, but has not yet been authenticated by the authentication engine 120. Blocks 130A-C may be referred to as "authenticated" frames, as they have been authenticated by the authentication engine 120.

An intruder who wants to identify cryptographic keys used to encrypt and authenticate data transmissions in network traffic may perform a brute force attack entailing performing a massive number of attempts to introduce malicious packets into the data transport stream as attempts to provide a correct cryptographic key to the network. A decoding failure in the FEC decoder 110 is assumed to occur, at most, very sporadically under normal operating conditions (typically beneath a threshold which may be measured over weeks). However, such a decoding failure typically leads to AF and subsequent blanking at the authentication engine 120 (explained below) following a FEC decoding failure. Should the receiver system 100 be constructed to accept sporadic Authentication Fail (AF) events resulting from sporadic FEC decoding failures, a potential for successful attacks on the receiver system 100 to occur at a low rate is thereby created.

A data frame in which errors occur, and the FEC decoder 110 is unable to correctly decode, such as, for example, data frame 140, may be referred to below as an "uncorrectable data frame" (UCF, as will be described below). A UCF may also be referred to as an "uncorrectable block" or "uncorrectable frame" or "uncorrectable word".

Accordingly, if the AF rate is kept beneath such a threshold (or, correspondingly, if a rate of UCFs is kept low) then an attacker may be able to inject only a few frames/packets before network protective systems detect an unexpected number of AFs and both execute appropriate consequent actions (as will be discussed below) and alert network administrators about a suspicious data transport stream.

Blanking results in the payload of the affected data frames (e.g., data frames 140, 150A-B) being overwritten by a replacement data that are statistically independent of the replacement data, for instance, a fixed pattern such as all '1's or all '0's (i.e., '11111111 . . . ' or '00000000 . . . '). Such a replacing of the payload in the continuous data transport stream protects the data transport stream's integrity. In this way information transported within the payload is completely corrupted. Typically, in such a case, a receiving client layer endpoint such as a switch will detect an invalid pattern and will trigger alarms. The triggering of alarms may further result in triggering of protection switches (i.e. a switch to protected traffic).

The receiver system 100 comprises other standard components, which are not depicted in FIG. 1, such as memory, processors, and storage, as is known in the art. The receiver system 100 also comprises an input interface and an output interface, of the type known in the art, which are, respectively, operative to receive a stream of input data transmission data frames, depicted by blocks 130E-F, 140, 150A-B, and output decoded and authenticated payload depicted by bocks 130A-C.

The FEC decoder 110 comprised in the receiver system 100 is operative to decode a so-called "modern" FEC code on the data transport stream (i.e. frames 130A-130F, 140, 150A-B). Modern FEC codecs may include, but are not necessarily limited to low density parity check (LDPC) codes, turbo codes, and other iteratively decoded FEC codecs which are used in high speed network communications, as are known in the art. The authentication engine 120 receives FEC decoded frames which contain authenticated and encrypted client data. By way of example, decoded data frame 130D is depicted as being input into the authentication engine 120, having been output from the FEC decoder 110. Other processes and operations (e.g., decryption) which do not impinge on the present disclosure may also occur in the receiver system 100, and accordingly, arrows indicating data flow within the receiver system 100 are shown in FIG. 1 with dotted lines. The authentication engine 120 authenticates said frames (e.g., decoded frame 130D). Authentication failure (AF) may result from an unintentional corruption (for example, the AF may be detected in incorrectly decoded data) or as a consequence of intentional data manipulation (e.g., data which has been maliciously injected or overwritten as part of an attack on the system of FIG. 1, as mentioned above).

In systems for high speed networking, such as the receiver system 100, the FEC decoder 110 and the authentication engine 120 are typically implemented in and executed by hardware. An example of hardware known in the art suitable for implementing the embodiments described herein is found in U.S. Pat. No. 8,942,379 of Loprieno et al., to Cisco Technology, Inc.

Data frames, such as the several data frames 130A-F, 140, 150A-B, are processed by the system, as will now be described in the following non-limiting example. Received frames 130E-F are depicted as not having any errors which the FEC decoder 110 will detect. Similarly, decoded frame 130D and authenticated frames 130A-C are depicted as not having any errors which the FEC decoder 110 has detected. Received frame 140, depicted with an overlying "X", on the other hand, has an error which will be detected by the FEC decoder 110. Received frames 150A-B do not (necessarily) have an error which the FEC decoder 110 will detect. The FEC decoder 110 will, usually, decode the data frames such as received data frames 130E-F and 150A-B. The FEC decoder 110 also typically is able to detect and correct an error, such as in received frame 140.

In rare cases, the FEC decoder 110 is unable to correct an error in a data frame, such as the error in received frame 140. In the majority of such cases, the FEC decoder is aware that it was unable to correctly decode the received data frame.

Errors which the FEC decoder 110 is unable to correctly decode, such as the error in received frame 140, result in AF. AF in turn leads to the consequent action, as will be described below. The consequent action results in payload data in the (one or more) security frames containing data of the incorrectly decoded data frame being blanked. In the present example, received frames 150A-B are depicted with a hash pattern in FIG. 1 and included in security frame 160. The hash pattern indicates that even though the received frames 150A-B do not (necessarily) have an error which the FEC decoder 110 will fail to correct, their payload will nevertheless be blanked as a consequent action resulting from the FEC error in received frame 140 of their security frame 160.

There is reason to suspect that the data frames 140, 150A-B comprising security frame 160 which have had their payload blanked may, at least in potential, have been maliciously injected into the data transport stream. Thus, a level of protection against such an attack is afforded by blanking the data frames 140, 150A-B comprising the security frame 160 in which frame 140 is comprised.

In order to overcome the loss of payload resulting from AF caused by an occasionally occurring 'random' post-FEC error, as opposed to an attack where malicious payload may have been introduced, in an embodiment, the authentication engine 120 may receive a UCF notification message 180 from the FEC decoder 110 when the FEC decoder 110 processes a data frame, such as the data frame 140 having an uncorrectable error. Receiving the notification message 180 enables the authentication engine 120 to correlate UCF events (i.e. the FEC decoder 110 identifying a data frame 140 as having a UCF) with detection of an AF, and the subsequent blanking of the security frame 160 by the authentication engine 120).

In some embodiments, when the authentication engine 120 correlates UCF events with AF events, the consequent action for some AF events in a security frame may be suppressed when the UCF is classified as "rare", where a "rare" UCF is defined as compliant with a statistical assumption or error model of an optical link. A statistical (error modeling) assumption describes an "error generation" mechanism on the optical link. It allows testing if an empirically observed error pattern is likely to be generated by the assumed mechanism or not. For instance, if a link is assumed to generate independent single errors with very low probability p, a likelihood of observing N adjacent errors $p^N$ is extremely low. Observing N adjacent errors can then be used to decide that such errors are very likely not caused by the channel, but by another mechanism (e.g. by an intrusion). When however, the error mechanism on the link is assumed to generate burst errors, it is actually expected that several errors occur adjacently, and an observation of adjacent errors is not an extremely rare event.

That is to say, an individual UCF (or AF) may be suppressed, and payload will not be blanked. On the other hand, a larger number of consecutive or nearly consecutive UCFs will be blanked, on the assumption that malicious traffic may have been injected by an attacker.

Figure 2:
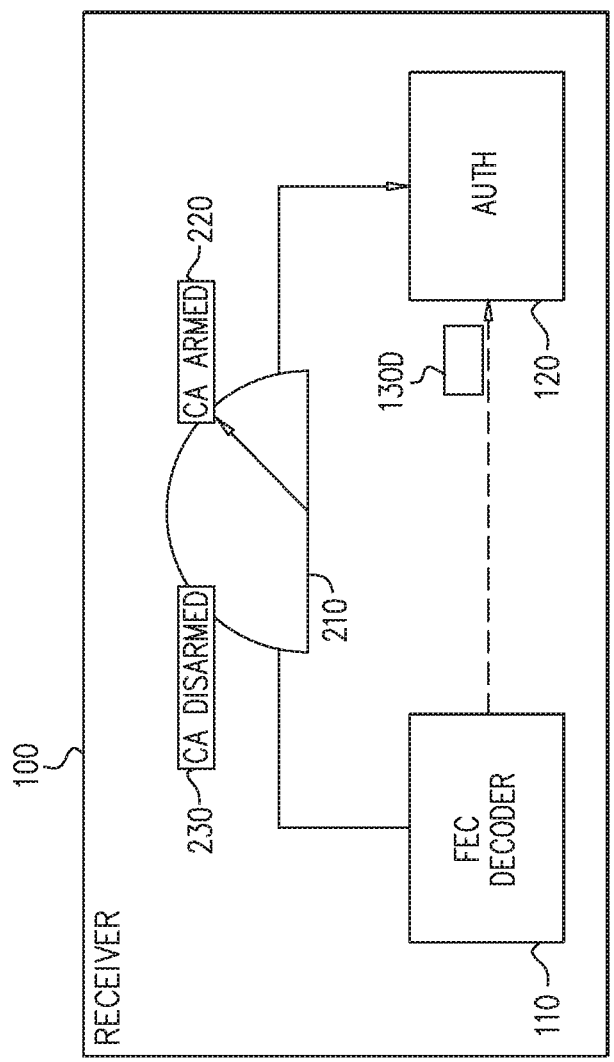
FIG. 2 is a second embodiment of the decoder constructed and operative in accordance with an example embodiment.

Reference is now made to FIG. 2, which is a second embodiment of the receiver system 100 constructed and operative in accordance with an embodiment of the present disclosure. The receiver system 100 is now implemented having a blanking decision state machine. In the first embodiment, a decision to blank frames is made on the basis of UCF, as explained above. In the presently described embodiment, the decision to blank frames is made on the basis of a temporal AF event arrival pattern. The blanking decision state machine will be described in greater detail below with reference to FIG. 3. A controller 210 has been added between the FEC decoder 110 and the authentication engine 120. The controller 210 has two states, consequent action (CA) armed 220 and CA disarmed 230. The controller 210 comprises a saturating counter, denoted guardCounter, that counts security frames.

The controller 210 receives a notification from the FEC decoder 110 (such as notification message 180 of FIG. 1) when the FEC decoder 110 detects a UCF event, and accordingly, enables suppressing of blanking as a consequent action resulting from a rare UCF event. On the other hand, the controller 210 will cause the receiver 100 to enter a mode where blanking is performed when needed as a consequent action when the authentication failure is caused either by a high UCF rate, or when the authentication failure is caused by some non-UCF related cause.

A "leaky bucket" threshold detector implemented over a large interval of time may be implemented. The interval of time may be measured, as a practical matter, as a number of frames decoded by the FEC decoder 110. As is known in the art, a method implementing the leaky bucket model is based on the idea that a bucket with a leak will overflow if either: the average rate at which water is poured into the bucket exceeds the rate at which the bucket leaks; or if more water than the capacity of the bucket is poured in at once (assuming that the bucket leaks at a constant rate).

A UCF rate threshold may be set in the system of FIG. 2 as a maximum acceptable number of UCF events or AF events expected in a specific interval of time (e.g., for example, and without limiting the generality of the foregoing, three UCF events per two weeks). Whenever a UCF rate is below the set UCF rate threshold, then the controller 210 causes suppression of the blanking of a security frame including the data frame (e.g. data frame 120) having the UCF event, as a consequent action resulting from the UCF. In the present case, if the rate of UCF errors remains low, then a "leaky bucket" threshold detector is utilized, as described above. Specifically, UCF errors may be ignored, and the consequent action (blanking) suppressed. However, if the rate of UCF errors becomes high, the consequent action is not to be suppressed.

Figure 3:
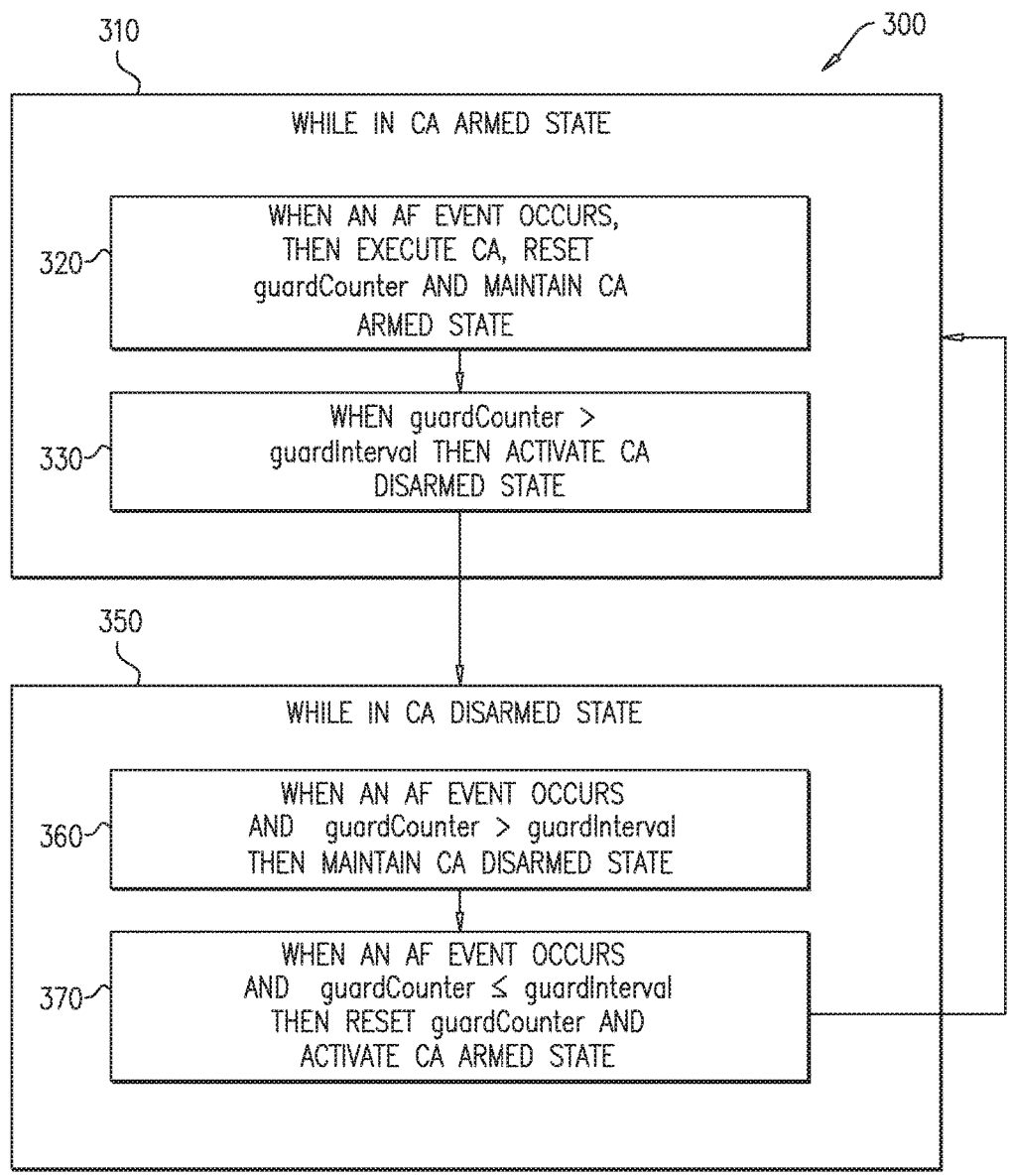
FIG. 3 is a flow chart depicting the blanking decision state machine of the embodiment of FIG. 2.

Reference is now additionally made to FIG. 3, which is a flow chart depicting the blanking decision state machine 300 of the embodiment of FIG. 2. The blanking decision state machine 300 of FIG. 3 is executed by the controller 210. When the controller 210 is in CA armed state 220—consequent action, i.e., payload blanking will occur on AF (block 310). While in CA armed state 220, when an authentication failure occurs (i.e. a UCF is detected), then the consequent action (blanking) is executed. The saturating counter, guardCounter is reset, and CA armed state 220 is maintained (block 320). When the saturating counter, guardCounter exceeds the interval of time, denoted guardInterval in FIG. 3, then CA disarmed 230 is activated (block 330).

When the controller 210 is in CA disarmed state 230 the consequent action, i.e., payload blanking, is suppressed (block 350). While in CA disarmed state 230, when an authentication failure occurs (i.e. a UCF is detected) and guardCounter exceeds guardInterval, then the consequent action (blanking) is suppressed, and CA disarmed state 230 is maintained (block 360). However, when guardCounter is less than or equal to guardInterval and an authentication failure occurs (i.e. a UCF is detected), then guardCounter is reset, and CA armed state 220 is activated (block 370). In other words, control is returned to block 310.

The embodiments described herein above with reference to FIGS. 1 and 2 comprise a FEC decoder 110 (FIGS. 1 and 2) aware embodiment, i.e., a notification of a UCF by the FEC decoder 110 (FIGS. 1 and 2) enables distinguishing between an authentication failure caused by a post FEC decoder 140 (FIGS. 1 and 2) error and a "true" authentication failure. The use of the saturating counter, guardCounter, is a minimum interval time of unblanked FEC (or AF) errors.

Figure 4:
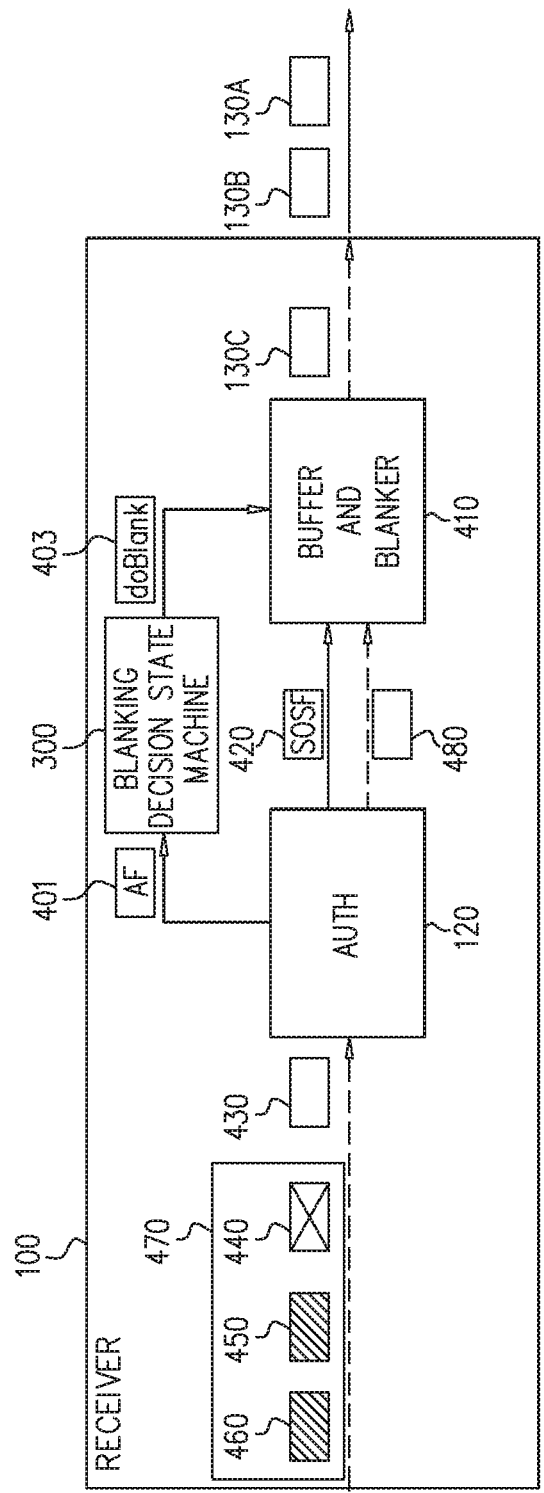
FIG. 4 is a block diagram of an alternative of the embodiment of FIG. 2.

Reference is now made to FIG. 4, which is a block diagram of an alternative of the embodiment of FIG. 2. The embodiment of FIG. 4 is designed to receive FEC decoded data frames, such as data frames 430, 440, 450, and 460. FEC decoded data frames 440, 450, and 460 are shown as being comprised in security frame 470.

When the authentication engine 120 receives the FEC decoded data frames 430, 440, 450, and 460, and is aware of an authentication failure (such as described above as occurring with reference to decoded data frame 140), by way of example, in data frame 440, the authentication engine 120 sends an authentication failure notification 401 to the blanking decision state machine 300.

In this, and in an embodiment where the blanking state machine is driven by UCF events, the authentication engine 120 also sends a start of security frame (SOSF) notification 420 to a buffer and blanker engine 410 comprised in the receiver system 100. For completeness sake, a data frame 480 is depicted as being transmitted to the buffer and blanker engine 410 in parallel with the SOSF 420. The data frame 480 might be the start of a not depicted security frame which may, for instance, also include data frame 430. The buffer and blanker engine 410 buffers received data frames in order to build a complete security frame (such as, for example security frame 470), and when necessary, blanks the payload of the data frames, such as data frames 440, 450, and 460 comprising the security frame 470, as described above. Specifically, upon receipt of a doBlank signal 403 from the blanking decision state machine 300, the buffer and blanker engine 410 blanks the payload of the data frames 440, 450, and 460.

Payload blanking may result in negative effects (possibly even destroying) on embedded client data structures. These effects on the client embedded data structures may in turn lead to link failures at the client. Accordingly, in yet another embodiment of the present disclosure, blanking may be delayed until the client data structures are de-mapped from a transport container. Once the de-mapping occurs, blanking can be performed in a client compatible manner. For example, rather than blanking payload of a security frame having several data frames which follow a UCF, such as data frame 440, the payloads of the several de-mapped client data structures may be replaced with well defined "idle" data frames. That is to say, the payload which would otherwise be blanked and subsequently damage client side data errors might be replaced with data which on the one hand is meaningless, but on the other hand will not cause any damage to the client side data structures.

By way of example, client data frames carried in a 100G Ethernet physical coding sublayer (PCS) block stream which is mapped into an OPU4 (Optical Payload Unit 4) where a stream of data frames contains a UCF, blanking can be deferred until after the client has been de-mapped from its OPU4 container (or other appropriate optical transport network data structure, as is known in the art). In such a case, the payload in the received PCS blocks can be replaced by idle blocks. Such a replacement is intended to avoid causing a client side failure caused by data structure damage.

Replacing data frames by idle frames results in obfuscation of the payload with an Ethernet Interpacket Gap ("IDLE"). In such a way, the receiving client layer endpoint will not detect any issue because it continue to receive proper Ethernet traffic. In such a case, the receiving client layer endpoint will not take an action (i.e., triggering an alarm).

It is appreciated that software components of the present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It is appreciated that various features of embodiments which are, for clarity, described in the contexts of separate embodiments may also be provided in combination in a single embodiment. Conversely, various features of embodiments which are, for brevity, described in the context of a single embodiment may also be provided separately or in any suitable subcombination.

It will be appreciated by persons skilled in the art that embodiments described herein are not limited by what has been particularly shown and described hereinabove. Rather the scope of embodiments are defined by the appended claims and equivalents thereof:

What is claimed is:

1. An apparatus comprising:
   an input interface operative to receive a stream of data frames, said data frames one of:
      comprising one or more security frames; or
      being comprised in security frames,
      wherein said security frames comprise payload data;
   a forward error correction (FEC) decoder operative to perform forward error correction on the data frames;
   a buffer and blanker engine operative to buffer received data frames to build a complete security frame of the received data frames;
   an authentication engine operative to determine whether or not to suppress taking a consequent action based on a frequency of authentication errors,
   wherein the consequent action to be taken or suppressed, when taken, is taken upon payload data of one or more security frames comprising a data frame upon which an authentication error occurred.

2. The apparatus of claim 1 wherein the consequent action comprises blanking the payload data of the one or more security frames comprising the data frame upon which the authentication error occurred.

3. The apparatus of claim 1 wherein the consequent action comprises replacing data frames comprising client data frames carried in payload data of the data frame in the one or more security frames comprising the data frame upon which the authentication error occurred with idle frames.

4. The apparatus of claim 1 wherein the authentication engine receives an uncorrectable frame (UCF) notification message from the FEC decoder when the FEC decoder processes a data frame having an uncorrectable error, whereupon the authentication engine suppresses the taking of the consequent action when the authentication engine determines that the UCF notification message is rare based on one of statistical assumption or an error model for the FEC decoder.

5. The apparatus of claim 1 wherein a state machine regulates whether or not the authentication engine suppresses taking consequent action.

6. The apparatus according to claim 5 wherein the state machine changes from a suppress taking consequent action state to a do not suppress taking consequent action state upon a number of uncorrectable frame (UCF) events exceeding a threshold.

7. The apparatus according to claim 5 wherein the state machine changes from a suppress taking consequent action state to a do not suppress taking consequent action state upon a number of authentication failure (AF) events exceeding a threshold.

8. The apparatus according to claim 1 wherein the buffer and blanker engine receives a start of security frame notification from the authentication engine.

9. The apparatus according to claim 1 wherein the buffer and blanker engine is operative to blank the complete security frame.

10. A method comprising:
receiving a stream of data frames at an input interface, said data frames one of:
comprising one or more security frames; or
being comprised in security frames,
wherein said security frames comprise payload data;
performing forward error correction on the data frames at a forward error correction (FEC) decoder;
buffering received data frames at a buffer and blanker engine and building a complete security frame of the received data frames;
determining whether or not to suppress taking a consequent action based on a frequency of authentication errors at an authentication engine,
wherein the consequent action to be taken or suppressed, when taken, is taken upon payload data of one or more security frames comprising a data frame upon which an authentication error occurred.

11. The method of claim 10 wherein the consequent action comprises blanking the payload data of the one or more security frames comprising the data frame upon which the authentication error occurred.

12. The method of claim 10 wherein the consequent action comprises replacing data frames comprising client data frames carried in a payload of the data frame in the one or more security frames comprising the data frame upon which the authentication error occurred with idle frames.

13. The method of claim 10 wherein the authentication engine receives an uncorrectable frame (UCF) notification message from the FEC decoder when the FEC decoder processes a data frame having an uncorrectable error, whereupon the authentication engine suppresses the taking of the consequent action when the authentication engine determines that the UCF notification message is rare based on one of statistical assumption or an error model for the FEC decoder.

14. The method of claim 10 wherein a state machine regulates whether or not the authentication engine suppresses taking consequent action.

15. The method according to claim 14 wherein the state machine changes from a suppress taking consequent action state to a do not suppress taking consequent action state upon a number of uncorrectable frame (UCF) events exceeding a threshold.

16. The method according to claim 14 wherein the state machine changes from a suppress taking consequent action state to a do not suppress taking consequent action state upon a number of authentication failure (AF) events exceeding a threshold.

17. The method according to claim 10 wherein the buffer and blanker engine receives a start of security frame notification from the authentication engine.

18. The method according to claim 10 wherein the buffer and blanker engine is operative to blank the complete security frame.

19. An apparatus comprising:
means for receiving a stream of data frames at an input interface, said data frames one of:
comprising security frames; or
being comprised in security frames,
wherein said security frames comprise payload data;
means for performing forward error correction on the data frames;
means for buffering received data frames and building a complete security frame of the received data frames;
means for determining whether or not to suppress taking a consequent action based on a frequency of authentication errors,
wherein the consequent action to be taken or suppressed, when taken, is taken upon payload data of one or more security frames comprising a data frame upon which an authentication error occurred.

20. The apparatus of claim 19 wherein the means for determining whether or not to suppress taking a consequent action receives an uncorrectable frame (UCF) notification message from the means for performing forward error correction when the means for performing forward error correction processes a data frame having an uncorrectable error, whereupon the means for determining whether or not to suppress taking a consequent action suppresses the taking of the consequent action when the means for determining whether or not to suppress taking a consequent action determines that the UCF notification message is rare based on one of statistical assumption or an error model for the means for performing forward error correction.

* * * * *